United States Patent Office 3,776,874
Patented Dec. 4, 1973

3,776,874
ALKYL-SULFOXIDE AND ALKYL-SULFONE TERMINATED OLIGOMERS AS EMULSIFIERS IN EMULSION POLYMERIZATIONS
Leland E. Dannals, Waterbury, Conn., assignor to Uniroyal, Inc., New York, N.Y.
No Drawing. Division of application Ser. No. 777,175, Nov. 19, 1968, now Patent No. 3,668,230, and a continuation-in-part of applications Ser. No. 547,743, May 5, 1966, now abandoned, Ser. No. 562,097, July 1, 1966, now Patent No. 3,498,943, and Ser. No. 562,098, July 1, 1966, now Patent No. 3,498,492. This application Aug. 25, 1971, Ser. No. 174,950
Int. Cl. C08d 1/09; C08f 1/13
U.S. Cl. 260—29.6 TA
18 Claims

ABSTRACT OF THE DISCLOSURE

Alkyl-sulfoxide and alkyl-sulfone terminated oligomers. Prepared by addition polymerization of monomer in presence of a mercaptan, followed by oxidation. Oligomers used as emulsifiers in the emulsion polymerization of one or more monomers to produce rubber or plastic latexes from which solid polymers can be obtained.

---

This is a division of application Ser. No. 777,175, filed Nov. 19, 1968 now U.S. Pat. No. 3,668,230 granted June 6, 1972.

CROSS-REFERENCES TO RELATED APPLICATIONS

This application is a continuation-in-part of (1) U.S. application Ser. No. 547,743 filed May 5, 1966, and entitled "Oligomers," now abandoned; (2) U.S. application Ser. No. 562,097 filed July 1, 1966, entitled "Emulsion Polymerization," now U.S. Pat. No. 3,498,943 and (3) U.S. application Ser. No. 562,098 filed July 1, 1966, entitled "Emulsion Polymerization," now U.S. Pat. 3,498,-492. The contents of each of said applications are incorporated by reference herein.

BACKGROUND OF THE INVENTION (1) Field of the invention

This invention relates to alkyl-sulfoxide and alkyl-sulfone terminated oligomers, to their preparation, and to their use as emulsifiers in emulsion polymerization.

(2) Description of the prior art

In the foregoing cross-referenced applications there are described alkyl-sulfide terminated oligomers, the preparation of such oligomers, and their use in emulsion polymerization. Where such oligomers are used in emulsion polymerization to produce rubber latexes, it frequently has been found that, at a given turbidity and solids content, the latex has a higher viscosity than would generally be advantageous. Thus, it would be desirable to obtain rubber latexes showing relatively lower viscosities at such turbidity and solids content. In addition, latexes prepared using conventional emulsifiers tend to foam, which impedes the removal of monomers and water therefrom and is generally disadvantageous. Hence, a latex that exhibits little or no foaming would be highly desirable.

SUMMARY OF THE INVENTION

This invention relates to oligomers, to a method of their preparation, and to their use, as in emulsion polymerization and the like. More specifically, the invention relates to obligomers having a backbone of carbon atoms and appendant polar groups. The oligomers of the invention may be used as surface active agents, emulsifiers or thickeners.

The oligomers of this invention are alkyl-sulfoxide or alkyl-sulfone terminated compounds having a backbone of from 4 to 100 carbon atoms in addition to those of the alkyl group. Attached to the oligomeric carbon atoms are appendant polar groups. At least one polar group is present for each two carbon atoms in the chain.

Generically, the oligomers may be represented by the following formula:

$$R-\overset{O}{\underset{Z}{\overset{\|}{S}}}-\left[\begin{array}{cc}R_1 & R_2\\ |&|\\ C-C\\ |&|\\ H & X\end{array}\right]_a\left[\begin{array}{cc}R_3 & R_4\\ |&|\\ C-C\\ |&|\\ H & Y\end{array}\right]_b-H$$

It is to be understood that the foregoing formula is not intended to depict the actual structure of the final compounds, inasmuch as structural units.

$$\left[\begin{array}{cc}R_1 & R_2\\ |&|\\ -C-C-\\ |&|\\ H & X\end{array}\right] \text{ and } \left[\begin{array}{cc}R_3 & R_4\\ |&|\\ -C-C-\\ |&|\\ H & Y\end{array}\right]$$

are randomly distributed in the molecule.

In the above generic Formula I, R is an alkyl group having from about 5 to 20 carbon atoms, or mixtures thereof; Z is oxygen or nothing; $R_1$ and $R_3$ may each be hydrogen, methyl, ethyl or —COOH groups; $R_2$ and $R_4$ each may be hydrogen, methyl, ethyl, —COOH or —CH$_2$COOH groups; Y is a strongly hydrophilic group such as —COOH, —CONH$_2$, —OCH$_3$, —CH$_2$OH, —OC$_2$H$_5$, or $$-\text{N}-\text{CH}_2-\text{CH}_2-\text{CH}_2-\overset{}{\text{C}}\text{O}$$

and X is either one of the aforesaid strongly hydrophilic groups or is a less hydrophilic group such as —COOC$_2$H$_4$OH, —COOC$_3$H$_6$OH, —CONHCH$_2$OH, —CONHC$_3$H$_7$, —COOCH$_3$, —COOC$_2$H$_5$, —CN, —OOCCH$_3$ —OOCC$_2$H$_5$, —CONHCH$_3$, $$-\text{COOCH}_2\text{CH}\underset{\text{O}}{\overset{}{\diagdown\diagup}}\text{CH}_2$$

or —CONHC$_2$H$_5$.

There must always be at least one strongly hydrophilic group, Y, present, but there need not necessarily be a less hydrophilic group, X, in which case $a$ in Formula I will be zero.

The foregoing oligomers may be prepared by addition polymerization of suitable monomers in the presence of alkyl mercaptans, followed by oxidation, as with hydrogen peroxide or ozone.

The alkyl-sulfide or alkyl-sulfone terminated oligomers have particular application as emulsifiers in the emulsion, addition polymerization of various monomers to produce rubber and plastic latexes from which solid polymers may be acquired.

DESCRIPTION OF THE PREFERRED EMBODIMENT

As previously noted, the oligomers of the invention are alkyl-sulfoxide or alkyl-sulfone terminated compounds having a backbone of from 4 to 100 carbon atoms in addition to those of the alkyl group. Attached to the oligomeric carbon atoms are appendant polar groups. At least one polar group is present for each two carbon atoms in the chain. The oligomers are generally water soluble, either by themselves or as the corresponding alkaline salts.

The method of preparing these oligomers results in a product having a very narrow molecular weight distribution. Thus, the polydispersity index, Mw/Mn, is always less than 2 and frequently as low as 1.4 to 1.5, as determined by the Gel Permeation Chromatographic technique.

Generically, the oligomers may be represented by the Formula I:

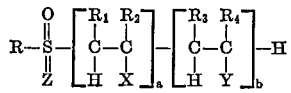

As noted, it is to be understood that the foregoing formula is not intended to depict the actual structure of the final compounds, inasmuch as the structural units

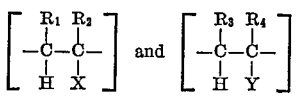

are randomly distributed in the molecule.

In the above generic Formula I, R is an alkyl group and may be a straight chain primary (normal), branched chain primary, secondary or tertiary alkyl group having from 5 to 20 carbon atoms, and preferably 6 to 12 carbon atoms, or mixtures thereof; Z is oxygen or nothing; (where Z is nothing, then the oligomer is alkyl-sulfoxide terminated; where Z is oxygen, then the oligomer is alkyl-sulfone terminated); $R_1$ and $R_3$ may each be hydrogen, methyl, ethyl or —COOH groups; $R_2$ and $R_4$ may each be hydrogen, methyl, ethyl, —COOH or

—CH$_2$COOH groups; Y is a strongly hydrophilic group such as

—COOH, —CONH$_2$, —OCH$_3$, —OC$_2$H$_5$, —CH$_2$OH, or

and X is either one of the aforesaid strong hydrophilic groups or is a less hydrophilic group such as

—COOC$_2$H$_4$OH, —COOC$_3$H$_6$OH, —CONHCH$_2$OH,

—CONHCH$_3$, —CONHC$_2$H$_5$, —CONHC$_3$H$_7$,

—COOCH$_3$, —COOC$_2$H$_5$, —CN, —OOCCH$_3$,

—OOCC$_2$H$_5$, or

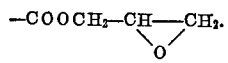

There must always be at least one strongly hydrophilic group, Y, present, but there need not be a less hydrophilic group, X.

The degree of polymerization, $a+b$, should be between about 2 and 50, and preferably between about 3 and 30. The mole fraction of the monomer having the X functional group $a/(a+b)$, may vary from 0 to 1 unless X is a less hydrophilic group, in which case the mole fraction must be less than 0.6, and preferably less than 0.55. The ratio of $a$ to $b$ may be varied as desired by those skilled in the art, depending most importantly, on the desired water solubility of the oligomer or its salts. For example, where the less hydrophilic group is ether —CN or —CONHCH$_2$OH, the mole fraction is most desirably from 0.3 to 0.5. On the other hand, where one of the other less hydrophilic groups is present, the preferred mole fraction is less than 0.3.

The molecular weight of the oligomers of this invention should be less than 5000, preferably less than 2000, but higher than 200.

The oligomers of this invention are soluble in water or are readily made soluble in water by conversion to salts, as by reaction with the appropriate metal oxide, metal hydroxide, ammonium (NH$_4^+$) hydroxide, amine, etc. While the ammonium, substituted ammonium, and alkali metal salts are broadly soluble, the alkaline earth metal and Group III heavy metal salts may also be soluble, particularly in the case of the oligomers having two strongly hydrophilic groups.

Salts of particular interest are those of sodium, potassium, ammonium, calcium, zinc, magnesium, barium, and the lower alkyl and alkanol substituted amines, e.g., monoethanolamine. One skilled in the art may readily determine which of the oligomers of the invention and which of their salts are water soluble.

A particularly preferred class of oligomers which are useful as emulsifiers has the formula:

$$R\text{—}S(O)\text{—}(CH_2\text{—}CR_1COOH)_b\text{—}H \qquad (II)$$

wherein R is an alkyl group having from about 6 to 12 carbon atoms, preferably a normal alkyl group having from about 7 to 11 carbon atoms, and most desirably from about 8 to 10 carbon atoms; $R_1$ is either hydrogen or methyl; and $b$, the degree of polymerization, is about 2 to 50, preferably from about 2 to 30, and most preferably from about 3 to 10. For use as an emulsifier, this class of oligomers may be used wherein only a small percent of the acid groups have been neutralized, as with ammonia, substituted ammonium compounds or alkali metal hydroxides.

Another preferred class of oligomers has the formula:

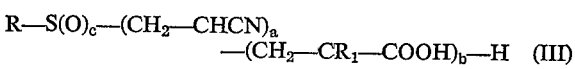

wherein R is a primary or secondary alkyl group having from about 6 to 12 carbon atoms, preferably a normal alkyl group having from about 7 to 11 carbon atoms, and most desirably, from about 8 to 10 carbon atoms; $c$ is an integer, and is either one or two; $R_1$ is either hydrogen or methyl; $a+b$, the degree of polymerization, is from about 4 to 50, preferably from about 12 to 30; and $a/(a+b)$ is 0 to 0.6 and preferably 0.2 to 0.55. For use as an emulsifier, this class of oligomers may be converted to the water soluble salt, e.g., ammonium or alkali metal salt.

A further preferred class of oligomers has the formula:

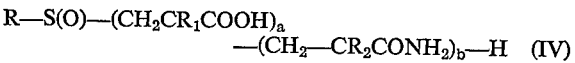

where R is a primary or secondary alkyl group, preferably a normal alkyl group having from about 6 to 20 carbon atoms, and most preferably from about 7 to 12 carbon atoms; $R_1$ is either hydrogen, methyl or

—CH$_2$COOH $R_2$ is hydrogen or methyl; $a+b$, the degree of polymerization, is about 6 to 50, and preferably from about 12 to 30; and $a/(a+b)$ is from about 0.075 to 0.40, and preferably from about 0.075 to 0.30. When a monofunctional acid is present the upper portions of the ranges are preferred, while for a difunctional acid the lower portions are preferred. Since this class of oligomers is water soluble, they may be used in their acid form or may be converted into their water soluble salts as previously described.

The oligomers of this invention are prepared by the addition polymerization of appropriate monomers in the presence of alkyl mercaptans, and this is followed by oxidation, as with hydrogen peroxide or ozone. Use of hydrogen peroxide or ozone as the oxidizing agent is preferred because they form no acid or salt by-products, which by-products might possibly have an adverse effect on latex properties and ultimate product performance. The use of potassium persulfate would form sulfates, while halogens would be converted to halides.

Typical examples of the oligomers of the present invention include the following:

| | | $(a+b)$ | $a/(a+b)$ |
|---|---|---|---|
| (1) | $n\text{-}C_8H_{17}S(O)\text{---}[\text{---CH}_2\text{---CH(COOH)---}]_3\text{---H}$ | 3 | 0 |
| (2) | $n\text{-}C_8H_{17}S(O)_2\text{---}[\text{---CH}_2\text{---CH(COOH)---}]_3\text{---H}$ | 3 | 0 |
| (3) | $n\text{-}C_8H_{17}S(O)\text{---}[\text{---CH}_2\text{---CH(COOH)---}]_4\text{---H}$ | 4 | 0 |
| (4) | $n\text{-}C_8H_{17}S(O)\text{---}[\text{---CH}_2\text{---CH(COOH)---}]_6\text{---H}$ | 6 | 0 |
| (5) | $n\text{-}C_8H_{17}S(O)\text{---}[\text{---CH}_2\text{---CH(COOH)---}]_{10}\text{---H}$ | 10 | 0 |
| (6) | $n\text{-}C_8H_{17}S(O)\text{---}[\text{---CH}_2\text{---C(CH}_3\text{)(COOH)---}]_3\text{---H}$ | 3 | 0 |
| (7) | $p\text{-}C_8H_{17}S(O)\text{---}[\text{---CH}_2\text{---CH(COOH)---}]_3\text{---H}$ | 3 | 0 |
| (8) | $t\text{-}C_8H_{17}S(O)\text{---}[\text{---CH}_2\text{---CH(COOH)---}]_3\text{---H}$ | 3 | 0 |
| (9) | $n\text{-}C_{10}H_{21}S(O)\text{---}[\text{---CH}_2\text{CH(COOH)---}]_3\text{---H}$ | 3 | 0 |
| (10) | $n\text{-}C_{12}H_{25}S(O)\text{---}[\text{---CH}_2\text{CH(COOH)---}]_3\text{---H}$ | 3 | 0 |
| (11) | $n\text{-}C_8H_{17}S(O)\text{---}[\text{---CH}_2\text{---CH(CN)---}]_8[\text{---CH}_2\text{---CH(COOH)---}]_8\text{---H}$ | 16 | 0.50 |
| (12) | $n\text{-}C_8H_{17}S(O)_2\text{---}[\text{---CH}_2\text{---CH(CN)---}]_8[\text{---CH}_2\text{---CH(COOH)---}]_8\text{---H}$ | 16 | 0.50 |
| (13) | $n\text{-}C_{10}H_{21}S(O)\text{---}[\text{---CH}_2\text{---CH(CN)---}]_{10}[\text{---CH}_2\text{---CH(COOH)---}]_{20}\text{---H}$ | 30 | 0.33 |
| (14) | $n\text{-}C_{10}H_{21}S(O)\text{---}[\text{---CH}_2\text{---CH(CN)---}]_8[\text{---CH}_2\text{---CH(COOH)---}]_8\text{---H}$ | 16 | 0.50 |
| (15) | $n\text{-}C_8H_{17}S(O)\text{---}[\text{---CH}_2\text{---C(CH}_2\text{COOH)(COOH)---}]_2[\text{---CH}_2\text{---CH(CONH}_2\text{)---}]_{18}\text{---H}$ | 20 | 0.10 |
| (16) | $n\text{-}C_{12}H_{25}S(O)\text{---}[\text{---CH}_2\text{---C(CH}_2\text{COOH)(COOH)---}]_2[\text{---CH}_2\text{---CH(CONH}_2\text{)---}]_{18}\text{---H}$ | 20 | 0.10 |
| (17) | $n\text{-}C_8H_{17}S(O)\text{---}[\text{---CH}_2\text{---C(CH}_2\text{COOH)(COOH)---}]_4[\text{---CH}_2\text{---CH(CONH}_2\text{)---}]_{16}\text{---H}$ | 20 | 0.20 |
| (18) | $n\text{-}C_8H_{17}S(O)\text{---}[\text{---CH}_2\text{---C(CH}_2\text{COOH)(COOH)---}]_4[\text{---CH}_2\text{---CH(CONH}_2\text{)---}]_{36}\text{---H}$ | 40 | 0.10 |
| (19) | $t\text{-}C_8H_{17}S(O)\text{---}[\text{---CH}_2\text{---C(CH}_2\text{COOH)(COOH)---}]_2[\text{---CH}_2\text{---CH(CONH}_2\text{)---}]_{18}\text{---H}$ | 20 | 0.10 |
| (20) | $n\text{-}C_8H_{17}S(O)\text{---}[\text{---CH}_2\text{---CH(COOH)---}]_4[\text{---CH}_2\text{---CH(CONH}_2\text{)---}]_{16}\text{---H}$ | 20 | 0.20 |
| (21) | $n\text{-}C_{12}H_{25}S(O)\text{---}[\text{---CH}_2\text{CH(COOH)---}]_4[\text{---CH}_2\text{---CH(CONH}_2\text{)---}]_{16}\text{---H}$ | 20 | 0.20 |

Thus, suitable monomers used in preparing the oligomers of this invention include acrylic acid, acrylonitrile, acrylamide, itaconic acid, methacrylic acid, methacrylamide, and the like, as well as mixtures thereof.

As previously noted, the oligomers of the present invention may be prepared by the addition of polymerization of appropriate monomers in the presence of alkyl mercaptans, followed by oxidation with hydrogen peroxide or ozone. As described in my copending application Ser. No. 547,743, the addition polymerization results in an alkyl-sulfide terminated oligomer of the formula

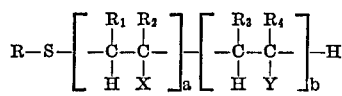

wherein R, $R_1$, $R_2$, $R_3$, $R_4$, X, Y, $a$, and $b$ are as previously defined.

The foregoing alkyl-sulfide terminated oligomer is then oxidized to the corresponding sulfoxide or sulfone. Preferably oxidation is effected by the use of hydrogen peroxide or ozone as the oxidizing agent. When the sulfoxide is desired, then a mole equivalent of hydrogen peroxide or ozone is employed per mole equivalent of sulfur. When the sulfone is desired, two mole equivalents of the hydrogen peroxide or ozone are employed per mole equivalent of sulfur.

The oxidation is conveniently carried out at a temperature from about 30 to 90° C., and preferably from about 50 to 70° C. The reaction time may vary widely, e.g., from 1 hour to 24 hours. In general, the lower the temperature, the longer is the time required. Preferably the reaction time is from about 1 to 2 hours.

Inasmuch as the alkyl-sulfide terminated oligomer is water soluble, either as is or as the alkali metal salt form, it is convenient to carry out the reaction with the oligomer in aqueous solution. The concentration of oligomer in the solution is desirably from about 10 to 50% by weight, and preferably from about 30 to 45% by weight.

When hydrogen peroxide is employed as the oxidizing agent, it is generally preferred to use an aqueous solution thereof. When ozone is employed as the oxidizing agent, it is usually advantageous to use an air-ozone stream.

The method of producing the sulfoxide-terminated and sulfone-terminated oligomers of the present invention is further illustrated by the examples hereinafter. See particularly Examples I–III.

The present invention also relates to the use of the instant alkyl-sulfoxide or alkyl-sulfone terminated oligomers as emulsifiers in the emulsion, addition polymerization of monomeric materials to produce rubber and plastice latexes from which solid polymers may be obtained.

In emulsion polymerization, the emulsifier plays a key role, not only in the polymerization itself, but also in the finishing of the latex and in its resultant properties. Because of the need to use existing resources as efficiently as possible, the rate of polymerization is a most important factor. It is also highly desirable that the emulsifier form a latex that is (1) low in macroscopic discontinuities, such as grain, coagulum, or microfloc, which cause manufacturing difficulties and reduce product utility, (2) low in foaming, as this would tend to obviate the need for antifoaming agents, (3) of small particle size or of low turbidity, inasmuch as this increases productivity and is also beneficial to ultimate use, (4) of low viscosity, since this makes for efficient transfer without hold-up losses, (5) of high latex solids concentration, since this increases productivity and decreases transportation costs, and (6) of good mechanical stability, for instance, giving low values in the S–1 test, since the latex must stand up against deterioration on storage, transport, compounding, and use. (In the S–1 test, the latex is stirred at a standard speed of 15,000 r.p.m. for 30 minutes, using a Hamilton Beach mixer. At the end of the stirring, the latex is filtered through 100 mesh screen and the retained coagulum dried and weighed. The S–1 mechanical stability of a latex is reported as percent of dry coagulum found during stirring, based on latex weight.)

The emulsion polymerization of the instant invention may be applied to the preparation of a wide variety of addition polymers. These polymers are formed by the polymerization of (1) copolymerizable monoethylenically unsaturated monomers and (2) of conjugated diolefinic monomers. Among the conjugated diolefin polymers and copolymers are polymeric materials from butadiene, butadiene - styrene, butadiene - acrylonitrile, butadiene-vinylidene chloride, butadiene-methacrylonitrile, and the like. The polymers and copolymers from monoethylenically unsaturated monomers include polymeric materials from styrene, styrene-acrylonitrile, styrene-methacrylonitrile, ethyl acrylate, ethyl acrylate-vinyl acetate, ethyl acrylate - methyl methacrylate, ethyl acrylate-styrene, ethyl acrylate-butyl acrylate, butyl acrylate-acrylonitrile, and the like.

The addition polymers produced by the emulsion polymerization of the instant invention may be of the rubber or plastic type, and consequently their emulsions can be termed rubber latex or plastic latex. Rubber may be defined as a material that is capable of recovering from large deformations quickly and forcibly, and which can be (or already has been) modified to a state in which it is essentially insoluble (but can swell) in boiling solvent such as benzene, methyl ethyl ketone and ethanol-toluene azeotrope, or the like.

Rubber in its modified state, free of diluents, retracts within one minute to less than 1.5 times its original length after being stretched at room temperature (20–27° C.) to twice its length and held for one minute before release.

Plastic may be defined as a material that contains as an essential ingredient an organic substance of large molecular weight, is solid in its finished state, but at some stage in its manufacture or in its processing into finished articles can be shaped by flow.

Particularly preferred polymeric materials for the present invention are those of the carboxylated conjugated diolefin type. These include interpolymers of butadiene and styrene or butadiene and acrylonitrile with organic acids such as itaconic acid, acrylic acid, methacrylic acid, maleic acid, fumaric acid, cinnamic acid, vinylacetic acid, ethacrylic acid, 2-ethyl-3-propylacrylic acid, beta-acryloxypropionic acid, sorbic acid, and the like.

The relative amounts of the aforesaid monomers vary widely, the proportions being well known to those skilled in the art. In the case of the carboxylated butadiene-styrene latexes the amount of polymerized butadiene and styrene varies from about 40 to 60% by weight based on the total weight of latex (i.e., 40 to 60% polymeric solids) and the amount of carboxyl component generally ranges from about 0.5 to 5% of the total polymerized monomers.

The emulsion solution, i.e., the aqueous solution of the oligomer, which may or may not be partially or completely neutralized, contains 20 to 60% solids and has a surprisingly low viscosity, e.g., 1–10 cps. at 10 to 20% solids. Generally 100 parts by weight of monomer for each 4 or 5 parts of solids in the emulsifier solution are introduced at a temperature of about 50° C. and at a pressure of 35–45 p.s.i.g. These conditions are typical and may be varied within wide ranges according to known emulsion polymerization and technology.

The range of typical emulsion polymerization recipes and reaction conditions are given in the following table.

TABLE

Range of Typical Emulsion Polymerization Recipes and Reactions Conditions

|  | Parts by weight | |
| --- | --- | --- |
|  | Broad | Preferred |
| Component: | | |
| Monomers | 100 | 100. |
| Water | 70 to 240 | 90 to 180. |
| Emulsifier | 2 to 8 | 3 to 6. |
| Modifier | 0 to 1.0 | 0 to 0.5. |
| Initiator | 0.2 to 2.0 | 0.3 to 1.5. |
| Electrolyte | 0 to 2.0 | 0 to 0.8. |
| Chelating agent | 0 to 0.1 | 0 to 0.07. |
| Reaction conditions: | | |
| Temperature, °C | −25 to 100 | 30 to 70. |
| Time, hrs | 100 to 200 | 15 to 36. |

The various modifiers, initiators, electrolytes and additives employed are conventional and are known to those skilled in the art. See e.g., Whitby, Synthetic Rubber, John Wiley & Sons, Inc., New York, 1954, pp. 224–283, the contents of which are herein incorporated by reference. As modifiers, aliphatic mercaptans are most commonly employed. Initiators include redox systems, which generate free radicals, with or without complexing agents, and variable valence metal ions. Common initiators are persulfates, peroxides, hydroperoxides, ferricyanides, peroxamines, and diazo compounds such as diazo bis(isobutyronitrile).

After about 95 to 100% conversion of monomer to polymer is achieved, the pH of the emulsion is increased to 8.5–9.5 with a base such as ammonium hydroxide. Any unreacted monomer may be driven off by bubbling steam through the system. This stripping operation is slow and difficult when latexes prepared with conventional emulsifiers are involved because of foaming, which impedes the distillation of monomers and water and requires foam traps and a distillation pot, only partly full, to avoid loss of latex by foam carry-over. By contrast, latexes prepared with the oligomeric emulsifiers of the present invention can be stripped rapidly from a nearly full pot without the use of a foam trap, since they exhibit little or no foaming. This behavior of the oligomeric emulsified latexes is of obvious significance. While anti-foaming agents can be used with conventional emulsifier latexes, these agents add to cost and may damage polymer properties by appearing in the polymer as a separate phase. Since stripping dilutes the latex, it is finally concentrated to about 50% solids. This operation, too, is greatly facilitated by the absence of foam in oligomeric emulsifier latexes and can be rapidly done by distilling off water from the latex in a distillation pot. Conventional emulsifier latexes can be only concentrated in apparatus which exposes a thin film of the latex, such as a multiple disc concentrator, because of foamy characteristics of the latex. The following examples will further illustrate our invention. Unless otherwise indicated, all parts are by weight.

EXAMPLE I

Low molecular weight polymers (i.e., oligomers) of this invention and having the general formula, alkyl-S(O)-(acylic acid)$_b$-H or alkyl-S-((O)$_2$-acrylic acid)$_b$-H, were prepared in methanol using ammonium persulfate as the initiator and were oxidized with hydrogen peroxide after the methanol had been distilled off and replaced with water.

The general procedure employed was to add acrylic acid, alkyl mercaptan, and methanol solvent to a reaction flask which was immersed in a thermostatted water bath and equipped with an addition funnel, a thermometer, an agitator, a water-cooled condenser and a nitrogen inlet. The solution was agitated, the nitrogen flow was commenced, and the content of the flask was heated. When the desired reaction temperature, in this example 29° C., was reached, a solution of the initiator in methanol was introduced at a controlled rate into the flask via the addition funnel. The reaction is exothermic, so that the temperature of the reacting system rises above that of the bath. When the reaction is complete, there is no difference between the temperatures of the reactants and the bath. The reaction system was then transferred to a distillation assembly which could be operated at reduced pressure and was equipped with a steam jet leading to the liquid phase of the distillation vessel. Water was added to the reaction system, the vessel was heated with external steam, and vacuum was applied. This caused methanol to appear in the distillation receiver. When this distillation had stopped the system was returned to atmospheric pressure and steam was introduced into the reactor through the jet. This caused water with traces of methanol to distill off as the temperature reached 100° C. The reaction system was cooled to about 50° C. and a mole of hydrogen peroxide, as a 30% aqueous solution, was added for each gram-atom of sulfur in the material. This addition of $H_2O_2$ which reacted to form the product, alkyl-S(O)-(acrylic acid)$_b$-H, was effected slowly so that the resulting exotherm did not exceed a temperature increase of 15° C. The system was kept at 60° C. for about one hour after the completion of the addition of the hydrogen peroxide, and was then cooled to room temperature. To maintain homogeneity of this aqueous solution of the oligomer at room temperature, it was necessary, in some cases, to neutralize some of the acid groups with potassium hydroxide or other basic material such as sodium hydroxide or ammonia. The product was converted to alkyl-S(O)$_2$-(acrylic acid)$_b$-H by adding another mole of hydrogen peroxide for each gram-atom of sulfur and heating at 90–100° C. for about an hour.

Run 1.—Preparation of n-octyl-S(O)-acrylic acid)$_3$-H

The following materials were added to the reaction flask:

288 g. (4.0 moles) acrylic acid
194.7 g. (1.33 moles) n-octyl mercaptan
207 g. methanol Following the procedure previously described, the reaction was initiated at the reaction temperature by introducing a 0.8% $(NH_4)_2S_2O_8$/methanol solution at a rate of 7.4 g./hour. The reaction temperature reached 35° C. during the first 3.5 hours and gradually returned to the bath temperature. After 6 hours the addition of initiator solution was stopped. The reaction system was slightly hazy but fluid. Solids determination showed 99.1% conversion of reactants to product.

Of this reaction system, 93.3% was transferred to the distillation vessel and methanol was removed following the previously described procedure. The product was cooled and 109 g. of 36.1% hydrogen peroxide were added. One hour after the exotherm was over, sufficient 20% KOH was added to neutralize 5% of the acid groups. The product was a clear solution with 31.4% solids.

Run 2.—Preparation of n-octyl-S(O)$_2$-(acrylic acid)$_3$-H 958.2 g. of the 31.4% solids solution of the product from Run 1 were placed in the distillation apparatus and 72.5 g. of 36.1% aqueous hydrogen peroxide were added. This system was then heated with external steam to 94° C. and then with internal steam to 98° C. and was kept at this temperature for one hour. On cooling, the solution showed a small amount of precipitate which was removed by filtration. The filtered solution had 18.9% solids.

The oligomers of Runs 1 and 2 of this example were surface active, as shown by surface tension measurements on diluted aqueous solutions thereof, in which 5%, 15%, or 25% of their acid groups were neutralized with KOH. These data, given in Table 1, show that the alkyl-sulfone terminated oligomer (Run 2) is slightly more surface active, at the higher concentrations, than the alkylsulfoxide terminated oligomer (Run 1).

TABLE 1

Surface Tension of Aqueous Solutions of n-Octyl-S(O)-(acrylic acid)$_3$-H and n-Octyl-S(O)$_2$-(acrylic acid)$_3$-H at Various Concentrations and KOH Neutralization

| Concentration | Surface tension, d./cm. | | | | | |
|---|---|---|---|---|---|---|
| | 10% | 5% | 1% | 0.5% | 0.1% | 0.05% |
| n-Octyl-S-(O)-(acrylic acid)$_3$-H: | | | | | | |
| 5% neutralized | 33 | 35 | 34 | 36 | 47 | 44 |
| 15% neutralized | 35 | 34 | 33 | 33 | 44 | 42 |
| 25% neutralized | 34 | 35 | 34 | 35 | 45 | 42 |
| n-Octyl-S(O)$_2$(acrylic acid)$_3$-H: | | | | | | |
| 5% neutralized | 31 | 32 | 30 | 31 | 45 | 48 |
| 15% neutralized | 31 | 31 | 32 | 31 | 45 | 50 |
| 25% neutralized | 31 | 33 | 30 | 36 | 47 | 49 |

Run 3.—n-Octyl-S(O)-(acrylic acid)$_4$-H

Following the procedure described in Run 1, 109.5 g. (0.75 mole) n-octyl mercaptan, 216 g. (3.0 moles) acrylic acid and 139.5 g. methanol were added to the reaction flask. The initiator, which was 0.8%

$$(NH_4)_2S_2O_8/methanol,$$

was added over a six hour period and totalled 16.3 g. The conversion of reactants to product was 95.8%. 95.3% of this reaction product was then stripped and oxidized with 81 g. of 30% hydrogen peroxide. The final product, when 1% of the acid groups were neutralized with KOH, was a clear solution and had 29.2% solids.

Additional runs in which there were prepared R-S(O)-(crylic acid)$_b$-H, all using the same general procedure described above, are given in Table 2.

TABLE 2

Preparation of R-S(O)-(acrylic acid)$_b$-H 

| Run No | 4 | 5 | 6 | 7 | ᵃ8 | 9 | 10 | 11 | 12 |
|---|---|---|---|---|---|---|---|---|---|
| Carbon atoms in R | 8 | 8 | 8 | 8 | 8 | 8 | 8 | 10 | 12 |
| R configuration$^c$ | n | n | n | n | n | p | t | n | n |
| b | 2.5 | 3.5 | 6 | 10 | 3 | 3 | 3 | 3 | 3 |
| Acrylic acid loaded, g | 227 | 252 | 216 | 144 | ᵃ258 | 288 | 288 | 216 | 216 |
| Mercaptan loaded, g | 184 | 146 | 73 | 29 | 146 | 195 | 195 | 174 | 202 |
| Methanol loaded, g | 176 | 171 | 124 | ᵈ282 | 146 | 207 | 207 | 167 | 179 |
| Initiator solution$^e$, g | 40 | 45 | 12 | d | 32 | 30 | 33 | 24 | 20 |
| Reaction time, hours | 3.3 | 6.7 | 4.3 | 7.0 | 5.5 | 5.5 | 5.0 | 4.7 | 4.5 |
| Percent conversion | 93 | 97 | 99 | 97 | 82 | 95 | 85 | 94 | 94 |
| Final solution, percent solids | 52 | 46 | 28 | 9 | 47 | 34 | 28 | 30 | 19 |
| Percent acid groups neutralized with KOH | 5.0 | 2.5 | 0.0 | 0.0 | 5.0 | 8.0 | 50 | 25 | 100 |
| Appearance$^f$ | C | C | C | M | M | C | H | M | H |

ᵃ Methacrylic acid was used in lieu of acrylic acid.
$^c$ Configuration of alkyl group with respect to the sulfur atom. $n$ is normal (unbranched chain with primary attachment of sulfur); $p$ is primary (branched chain with primary attachment of sulfur); $t$ is tertiary attachment of sulfur.
$^d$ Isopropyl alcohol alcohol was used. The initiator system was 1 g. lauroyl peroxide and 0.25 g. N. N-dimethyl aniline.
$^e$ Initiator solution was 0.8% (NH$_4$)$_2$S$_2$O$_8$ in methanol.
$^f$ C is clear; H is hazy; M is milky.

EXAMPLE II

Low molecular weight polymers (i.e., oligomers) of this invention and having the general formula n-alkyl-S(O)$_c$-(acrylonitrile)$_a$-(acrylic acid)$_b$-H were prepared in methanol or isopropyl alcohol using ammonium persulfate or lauroyl peroxide as the initiator and were oxidized with hydrogen peroxide before or after the alcohol had been distilled off and replaced with water.

The general procedure was to add the acrylic acid, acrylonitrile, n-alkyl mercaptan and methanol to a flask which was immersed in a thermostatted water bath and equipped as described in Example I. The continuous addition of the ammonium persulfate initiator solution to cause the reaction to proceed and the concomitant changes in the temperature of the reaction system to the apparent completion of this oligomerization were also as described in Example I.

When lauroyl peroxide was used as the initiator, it was added dry to the reaction mixture, either all at one time or in a few increments. Usually the lauroyl peroxide was activated by the addition of N,N-dimethyl aniline. The reaction system was oxidized with hydrogen peroxide using one or two moles of hydrogen peroxide per gram-atom of sulfur, either before the methanol had been distilled off and replaced with water, but preferably this oxidation was effected after the distillation. The distillation assembly was as described in Example I, except that the internal jet could be raised so that a stream of air would impinge on the surface of the liquid in the pot.

Since the reaction system as well as the product were not soluble in water until some of the acid groups had been neutralized, enough aqueous KOH solution to neutralize at least 70% of the acid groups was added to the reaction system at the time of transfer to the still. The contents of the pot were heated and most of the methanol was removed, either by reducing the pressure or by drawing air over the surface of the liquid in the pot. However, ultimately steam was introduced into the liquid and this caused water and traces of methanol to appear in the receiver with the pot temperature reaching the boiling point of water. The liquid remaining in the pot was cooled to about 50° C. and enough aqueous hydrogen peroxide was added to oxidize each sulfide to sulfoxide. An exotherm was observed upon this addition and one hour after it had subsided, the product, which had 20–50% solids and was macroscopically homogeneous, was removed. The sulfoxide was converted to the sulfone by adding to the solution one mole of aqueous hydrogen peroxide for each gram-atom of sulfur and heating at about 90° C. for about one hour.

Run 1.—Preparation of n-octyl-S(O)-(acrylonitrile)$_8$-(acrylic acid)$_8$-H and n-octyl-S(O)$_2$-(acrylonitrile)$_8$-(acrylic acid)$_8$-H The following materials were added to the reaction flask:

216 g. (3 moles) acrylic acid
159 g. (3 moles) acrylonitrile
58.4 g. (0.375 mole) n-octyl mercaptan
61.5 g. methanol Following the procedure previously described the reaction was initiated at 28° C. by introducing 0.8%

$$(NH_4)_2S_2O_8$$

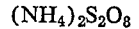

in methanol at such a rate that 119 g. had been added over 6.8 hours. The temperature of the reacting system was kept in the range of 33–38° C., but during the last 1.5 hours, the bath temperature was raised to 35° C. The resulting transparent yellowish liquid weighed 628.6 g. and showed 97.8% conversion by solids determination. 508.3 g. of this reaction product was transferred to the still and enough aqueous KOH solution was added to neutralize 72% of the acid groups. The methanol was removed, first by drawing air over the surface of the liquid and then by introducing steam into the liquid. When the specific gravity of the distillate had reached 0.994, it was evident that the methanol removal was complete. The pot residue now weighed 1460 g., was homogeneous, and containing 23.3% alkyl-sulfide terminated oligomer. A portion of this solution was diluted to 10% oligomer, which showed a pH of 5.7. By adding KOH to other portions and then diluting, 10% oligomer solutions were prepared at pH's of 6.0, 6.5, and 9.0. The sulfoxide and sulfone derivates were prepared from these 10% solutions by adding the appropriate amount of hydrogen peroxide and heating with atmospheric steam for an hour. These oxidized product solutions were diluted to 8% oligomer.

Run 2.—Preparation of n - R - S(O)$_2$ - (acrylonitrile)$_8$-(acrylic acid )$_{12}$-H where R is a mixture of n-octyl and n-dodecyl in 99/1 mole ratio The following materials were added to the reaction flask:

121.0 g. (1.68 moles) acrylic acid
59.4 g. (1.12 moles) acrylonitrile
10% of a mixture of 20.24 g. (0.1386 mole) n-octyl mercaptan and 0.28 g. (0.0014 mole) n-dodecyl mercaptan
56 g. isopropyl alcohol
1.4 g. lauroyl peroxide The reaction flask assembly was placed in a 50° C. thermostatted bath and nitrogen flow was started. After 23 minutes the reaction started as indicated by a slight exotherm. The observations and additions are given in Table 3

TABLE 3

Observations and Additions in Run 2 of Example II

| Time, min.[1] | Reaction temperature, °C. | Percent conversion by percent solids | Percent of mixed mercaptans added | Other manipulation, addition |
|---|---|---|---|---|
| 30 | 49.2 | | 10 | |
| 50 | 48.8 | 13 | | |
| 60 | 48.8 | | 10 | |
| 75 | 48.2 | | 10 | |
| 95 | 48.2 | 46 | | |
| 120 | 48.0 | 59 | | |
| 127 | | | 10 | |
| 155 | 47.8 | | 10 | |
| 162 | 48.0 | 59 | | |
| 200 | | | 10 | 15 g. isopropyl alcohol. |
| 230 | 48.0 | 79 | | 20 g. isopropyl alcohol. |
| 234 | | | | 26.2 g. acrylic acid and 2.67 g. mercaptan mix. |
| 251 | | | 10 | 15 g. isopropyl alcohol. |
| 277 | | | 10 | |
| 300 | 47.7 | 78 | | |
| 305 | | | 10 | 10 g. isopropyl alcohol. |
| 360 | | 86 | | 38 g. isopropyl alcohol. |

[1] From start of the reaction.

The reaction mass was permitted to stand overnight and then showed 57.5% solids, which indicated 95.8% conversion. For stripping, 228.7 g. of this reaction product, which contained 131.5 g. of the alkyl-sulfide terminated oligomer, was mixed with 33 g. of potassium hydroxide and 550 g. of water. This mixture was vacuum stripped at 90° C. and gave 100 ml. of clear distillate. The flask residue was diluted to 10% alkyl-sulfide terminated oligomer and this solution had a pH of 6.5 and was slightly hazy. This oligomer was converted to the alkyl-sulfone terminated oligomer by mixing 500 g. of the 10% solution with 8.3 g. of 30% hydrogen peroxide, heating in atmospheric steam for one hour, stripping off 10 g. of water, cooling, adjusting the pH to 6.5 with 20% potassium hydroxide, and diluting to 10% alkyl-sulfone terminated oligomer.

That both the alkyl-sulfide and the alkyl-sulfone terminated oligomers were emulsifiers is demonstrated in Table 4, which gives surface tension measurements at various concentrations. The alkyl sulfide terminated oligomer appears to be more surface active than its oxidized derivative at the lower concentrations.

TABLE 4

Surface Tension of Various Aqueous Solutions of n-R-S-(acrylonitrile)$_8$-(acrylic acid)$_{12}$-H and Its Sulfone, Where R is a 99/1 Mole Mixture of n-Octyl and n-Dodecyl, at pH 6.5, KOH Neutralized

| | Surface tension, d./cm. | | | | |
|---|---|---|---|---|---|
| Concentration | 10% | 5% | 1% | 0.5% | 0.1% |
| n-R-S-(acrylonitrile)$_8$-(acrylic acid)$_{12}$-H | 32 | 29 | 37 | 43 | 53 |
| n-R-S-(O)$_2$-(acrylonitrile)$_8$-(acrylic acid)$_{12}$-H | 30 | 30 | 44 | 49 | 59 |

Run 3.—n-Decyl-S(O)-(acrylonitrile)$_{10}$-(acrylic acid)$_{20}$-H

Following the procedure in Run 1, 288 g. (4 moles) acrylic acid, 106 g. (2 moles) acrylonitrile, 34.8 g. (0.2 mole) n-decyl mercaptan and 166.5 g. methanol were added to the reaction flask. This reaction system was brought to equilibrium with the 28° C. bath and the initiator solution (0.8% (NH$_4$)$_2$S$_2$O$_8$ in methanol) was added at a rate that effected the addition of 134.6 g. in 6.5 hours. The reaction temperature was kept in the 33–38° C. range, although during the last two hours of the reaction it was necessary to raise the bath temperature to 35° C. The reaction product weighed 721.4 g. and its solids content indicated that 98.0% conversion was reached. For removal of the methanol, 611.2 g. of this reaction product was placed in the still and 26.0 g. 85% KOH pellets dissolved in 700 g. water were added. This amount of base neutralized 72% of the acid groups. The methanol was removed by means of an air stream and steam until the specific gravity of the distillate was 0.998. The pot residue weighed 1374 g. and had 26.0% oligomer content. To oxidize the oligomer, that amount of this solution which contained 60 g. of the oligomer was diluted to 600 ml. with water and this solution was heated to 50° C. On addition of 3.6 g. of 30% hydrogen peroxide, an exotherm of 0.4° C. was observed. The pH of this solution was 5.7.

Run 4.—n-Decyl-S(O)-(acrylonitrile)$_8$-(acrylic acid)$_8$-H

Following the procedure in Run 1, 216 g. (3 moles) acrylic acid, 159 g. (3 moles) acrylonitrile, 65.2 g. (0.375 mole) n - decyl mercaptan and 61.5 g. methanol were added to the reaction flask. This reaction system was brought to equilibrium with the 28° C. bath and the initiator solution (0.8% (NH$_4$)$_2$S$_2$O$_8$ in methanol) was added at such a rate that 142.6 g. had been added over 6.7 hours. The reaction temperature ranged from 30 to 36° C. for the first four hours of the reaction. During the last 2.7 hours, the bath temperature was raised to 35–36° C. and the reaction temperature reached 38° C., then fell to 36° C. The reaction product weighed 641.5 g. and showed, by solids determination, a conversion of 95.8%. There were placed in the still 569.4 g. of this reaction product and 124.8 g. 85% KOH dissolved in 668 g. water. The methanol was removed, first with an air stream and then by steam. The specific gravity of the distillate reached 0.998 when 400 ml. had been collected. There was 21.9% oligomer in the pot residue, which had a pH of 5.7. This oligomer solution was diluted to 10% oligomer and heated to 50° C. There were added 6.1 g. 30% hydrogen peroxide, and an exotherm of 1.0° C. was observed. After one hour at 50° C., the reaction solution was cooled to room temperature.

Run 5.—Preparation of n-octyl-S-(O)$_2$-(acrylonitrile)$_8$-(acrylic acid)$_8$-H by oxidation with ozone An aqueous solution of the oligomer, n-octyl-S-(acrylonitrile)$_8$-(acrylic acid)$_8$-H, which was almost completely neutralized and stripped, contained 11.8 g. (8.14 millimoles) of the neutralized oligomer in 91 ml. of solution. To this was added 200 ml. of water, and it was then reacted with 16.3 millimoles of O$_3$ contained in O$_2$ in an ozonation vessel equipped with a KI trap. It was necessary to add the O$_3$ in one-quarter portions and to allow the form to settle before more was added. The O$_3$ was absorbed quantitatively since there was no discoloration of the KI. The product was an aqueous solution of the n-octyl-sulfone-terminated oligomer.

EXAMPLE III

Low molecular weight polymers (i.e., oligomers) of the invention having the general formula alkyl-S(O)-(A)$_a$-(acrylamide)$_b$-H with (A) representing a polymerizable carboxylic acid, were prepared in isopropyl alcohol, lauroyl peroxide serving as the initiator, N,N-dimethyl aniline serving as the activator, to give as an intermediate a precipitate which was washed with alcohol, dried in an air stream, dissolved in water and oxidized by hydrogen peroxide. The apparatus used for the oligomerization was described in Example I. The product was a fine precipitate in this reaction system and was removed by filtration through paper. The retained precipitate was washed with isopropyl alcohol and dried by drawing air through it. For oxidation, the apparatus used for oligomerization was again employed. The dry powder was dissolved in water and placed in the reaction vessel. The solution reached equilibrium with the 50° C. bath and enough aqueous hydrogen peroxide was added to oxidize each sulfide linkage to sulfoxide. After cooling, the solution of the oligomer was ready for use.

Run 1.—Preparation of n-octyl-S(O)-(itaconic acid)$_2$-(acrylamide)$_{18}$-H

The following materials were added to the reaction flask:

512.2 g. (7.214 moles) acrylamide
104.2 g. (0.8015 mole) itaconic acid
58.5 g. (0.4008 mole) n-octyl mercaptan
12.0 g. lauroyl peroxide
2525 ml. isopropyl alcohol The flask was placed in a 37° C. thermostatted bath, such initial placement serving as the reference time. The reaction temperature was 35.2 °C. at 35 minutes and 4 g. N,N-dimethyl aniline were added. At 90 minutes, the reaction temperature reached 41.0° C. and 19.6 g. (0.1344 mole) n-octyl mercaptan were added. The reaction temperature was 43.8° C. at 125 minutes and 6 g. lauroyl peroxide were added. N,N-dimethyl aniline (4 g.) was added at 145 minutes, when the contents of the flask were at 44.5° C. The reaction temperature peaked at 45.0° C. between 150–160 minutes, then fell continuously and reached 37.0° C. at 255 minutes, and did not change during the next thirty minutes. The reaction system was vacuum filtered through paper. The precipitate was slurried in methanol which had been heated to 60° C., and was then filtered again. The precipitate was washed with 700 ml. methanol and dried overnight by drawing air through it. The next day, the precipitate weighed 627 g., which indicated a 90% yield. Some of the product was dissolved in water with enough calcium hydroxide to neutralize half of the acid groups to thereby prepare a 10% aqueous solution which had a 52.7 d./cm. surface tension and thus was a surface active agent. The product (130.8 g.) was dissolved in 415 g. water and placed in an agitated flask in a 49.0° C. thermostatted bath. When the flask contents reached equilibrium with the bath, 7.54 g. 35% hydrogen peroxide was added and an exotherm of 0.7° C. was observed. After cooling, the solution contained 24.8% oligomer. The solution showed 41 d./cm. surface tension and 15 cps. viscosity.

Run 2.—Preparation of n-dodecyl-S(O)-(itaconic acid)$_2$-(acrylamide)$_{18}$-H

There were placed in a crown cap soda bottle, 63.9 g. (0.9 mole) acrylamide, 13.0 g. (0.1 mole) itaconic acid, 10.1 g. (0.05 mole) n-dodecyl mercaptan, 1.5 g. lauroyl peroxide, and 275.7 g. isopropanol. The vapor phase in the bottle was flushed with nitrogen and the cap attached. The bottle was rotated, as the spoke in a wheel, for 24 hours in a 50° C. thermostatted bath. The reaction system was vacuum filtered and the precipitated product was washed with 300 ml. isopropyl alcohol and 300 ml. acetone. The product was dried by drawing air through it for 24 hours. It weighed 84.4 g., which indicated a 97% yield. This product (52.0 g.) was dissolved in 301.4 g. water and placed in an agitated flask which was located in a 49.0° C. bath. When the contents of the flask were at the bath temperature, 2.84 g. of 35.8% aqueous hydrogen peroxide was added and an exotherm of 0.4° C. was observed. After one hour the solution, which contained 14.7% oligomer, was removed and bottled. The solution had 44 d./cm. surface tension and 12 cps. viscosity.

Run 3.—Preparation of n-octyl-S(O)-(itaconic acid)$_4$-(acrylamide)$_{16}$-H

There were placed in a reaction flask 74.7 g. (1.052 moles) acrylamide, 31.6 g. (0.263 mole) itaconic acid, 9.6 g. (0.0658 mole) n-octyl mercaptan, 2.0 g. lauroyl peroxide, and 460 ml. isopropyl alcohol. At the reference time, the flask was placed in a 40.0° C. thermostatted bath. N,N-dimethyl aniline (1,3 g.) was added at 18 minutes. The reaction temperature rose to 41–42° C. and at times of 50, 87 and 133 minutes, 1 g. lauroyl peroxide and 0.7 g. N,N-dimethyl aniline were added. At 220 minutes the reaction system was vacuum filtered and the precipitate was dried in an air stream to a constant weight of 95.9 g., which indicated 82.7% yield. This product (29.0 g.) was dissolved in 203 g. water and placed in an agitated flask which was located in a 49.0° C. bath. An exotherm of 0.4° C. was observed when 1.5 g. of 35.8% aqueous hydrogen peroxide were added to the flask. The reaction product was kept in the flask for one hour and showed 12.75% oligomer solution. This solution had 38 d./cm. surface tension and 10 cps. viscosity.

Run 4.—Preparation of n-octyl-S(O)-(itaconic acid)$_4$-(acrylamide)$_{36}$-H

There were charged to the reaction flask 503.2 g. (7.087 mole) acrylamide, 102.4 g. (0.7875 mole) itaconic acid, 28.7 g. (0.1969 mole) n-octyl mercaptan, 11.8 g. lauroyl peroxide, and 2481 ml. isopropyl alcohol. At the reference time, the flask was placed in a 40° C. thermostatted bath. After 25 minutes, 4 g. N,N-dimethyl aniline were added. The reaction temperature reached 40.2° C. at 95 minutes and 4 g. N,N-dimethyl aniline were added. At 120 minutes the reaction temperature peaked at 42.2° C. and then fell to 36° C. at 380 minutes. The reaction product was removed by vacuum filtration, washed with 1250 ml. acetone and dried in an air stream to a weight of 544 g. compared to the theoretical of 634.3 g. This product (100.5 g.) was dissolved in 410 g. water and placed in an agitated flask in a bath thermostatted at 49.0° C. The addition of 2.96 g. of 35.8% aqueous hydrogen peroxide produced an exotherm of 0.7° C. The resulting solution contained 20.2% oligomer, and had 34 d./cm. surface tension and 8 cps. viscosity.

Run 5.—Preparation of n-octyl-S(O)-itaconic acid)$_{1.125}$-(acrylamide)$_{13.875}$-H In a reaction flask were placed 408.0 g. (5.7464 moles) acrylamide, 60.6 g. (0.4659 mole) itaconic acid, 60.5 g. n-octyl mercaptan, 15.5 g. lauroyl peroxide, and 2586 ml. isopropyl alcohol. The flask was placed in a bath thermostatted at 40° C. at the reference time. At 33 minutes, 2.4 g. N,N-dimethyl aniline were added. The reaction temperature increased to 42.0° C. at 95 minutes and 2.4 g. N,N-dimethyl aniline were added. The peak reaction temperature of 43.5° C. was reached at 115 minutes and then it fell continuously until 36.0° C. was reached at 270 minutes. The precipitated product was removed by vacuum filtration, washed with 1300 ml. acetone and dried in an air stream to a weight of 400 g., the theoretical yield being 529 g. 106.0 g. of this product were dissolved in 420 g. of water and placed in an agitated flask in a 49.0° C. thermostatted bath. Upon the addition of 7.87 g. of 35.8% aqueous hydrogen peroxide an exotherm of 0.7° C. was observed. The resulting solution contained 20.9% oligomer, the solution having 32 d./cm. surface tension and 13 cps. viscosity.

Run 6.—Preparation of t-octyl-S(O)-(itaconic acid)$_2$-(acrylamide)$_{18}$-H

In a reaction flask were placed 96.5 g. (1.36 moles) acrylamide, 19.6 g. (0.151 mole) itaconic acid, 11.0 g.

(0.076 mole) t-octyl mercaptan, 2.27 g. lauroyl peroxide and 476 ml. isopropyl alcohol. The flask was placed in a 40° C. thermostatted bath at the reference time. At 25 minutes, 0.3 g. N,N-dimethyl aniline was added. At 75 minutes, the reaction temperature had reached 40.0° C. and 0.3 g. N,N-dimethyl aniline was added. Lauroyl peroxide (2.2 g.) was added at 95 minutes when the temperature was 41.0° C. At 110 minutes, 0.7 g. N,N-dimethyl aniline was added. The reaction temperature peaked at 44.4° C. at 120 minutes. At 135 minutes, 2.2 g. lauroyl peroxide was added and at 155 minutes, 0.7 g. N,N-dimethyl aniline was added. The reaction temperature fell to 39.5° C. at 230 minutes. The product was removed by filtration, washed with 475 ml. isopropyl alcohol, reslurried with 476 ml. isopropyl alcohol (previously heated to 60° C.), filtered, washed with 475 ml. isopropyl alcohol, and dried by an air stream to a weight of 121.8 g. This compares to a theoretical yield of 127.1 g. To 30.0 g. of this product were added 211 g. of water and a solution was formed. This solution was placed in a 48.5° C. thermostatted bath and when the contents were at constant temperature, 1.70 g. of 35.8% aqueous hydrogen peroxide were added. An exotherm of 0.4° C. was observed. The resulting solution contained 12.76% oligomer. This solution had 37.4 d./cm. surface tension and 12 cps. viscosity.

Run 7.—Preparation of n-C$_8$/C$_{12}$ alkyl-S(O)-(acrylic acid)$_4$-(acrylamide)$_{16}$-H The following ingredients were placed in a reaction flask: 100 g. (1.408 moles) acrylamide, 25.3 g. (0.352 mole) acrylic acid, 12.5 g. (0.0858 mole) n-octyl mercaptan, 0.44 g. (0.0022 mole) n-dodecyl mercaptan, 1.3 g. lauroyl peroxide, and 634 ml. isopropyl alcohol. The flask was placed in a bath thermostatted at 40° C. at the reference time. At 20 minutes, 0.2 g. N,N-dimethyl aniline was added. The reaction temperature increased to 44.5° C. at 70 minutes and 0.2 g. N,N-dimethyl aniline was added. The temperature peaked at 45.4° C. and 82 minutes. At 92 minutes, 0.7 g. lauroyl peroxide was added. At 100 minutes, 0.2 g. N,N-dimethyl aniline was added. The reaction temperature had fallen to 40.5° C. at 200 minutes. The product was filtered off and washed with 634 ml. isopropyl alcohol. The product was dried in an air stream, the amount of dried product indicating a 96% yield. 30.0 g. of this product were dissolved in 210 g. water. At 49.0° C., 1.81 g. of 35.8% aqueous solution of hydrogen peroxide was added. An exotherm of 0.4° C. was observed. The finished solution contained 12.5% oligomer. This solution had 32 d./cm. surface tension and 5.5 cps. viscosity.

The following examples illustrates the use of our oligomers in emulsion polymerization.

EXAMPLE IV

Part A

To conduct the emulsion polymerization, twenty-four fluid ounce soda bottles containing the polymerization ingredients were fitted with a crown cap having a small hole in the center. The metal cap was fitted with a self-sealing rubber gasket so that upon addition of the materials or removal of samples by use of a hypodermic ensemble, the cap would be self-sealing. A plurality of these bottles were rotated, as spokes of a wheel, in a thermostatic bath at 50° C. at eleven revolutions per minute. Prior to capping, the bottles were purged of oxygen by the introduction of slight excess of butadiene which was allowed to evaporate. The emulsifier used was of the formula:

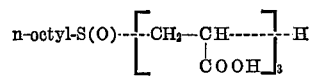

this being a preferred emulsifier. It was dissolved in water and sufficient potassium hydroxide was added so as to neutralize 67% of the acid groups.

The polymerization ingredients, listed in Table 5, were placed in the bottle, in amounts, as grams, equal to twice the indicated figures.

TABLE 5

Emulsion polymerization recipe for a carboxylated butadiene styrene latex

| Component: | Parts by weight |
|---|---|
| Butadiene | 40 |
| Styrene | 59 |
| Itaconic aacid | 1 |
| Potassium persulfate | 1 |
| Oligomer | 4 |
| Sodium carbonate | 0.4 |
| Tetrasodium ethylenediamine tetraacetate | 0.05 |
| Tertiary dodecyl mercaptan | 0.15 |
| Water | 105 |

After 22 hours at 50° C. the conversion of monomer to polymer was virtually complete, as was shown by a vacuum inside the bottle when a hypodermic needle was inserted through the hole in the cap. The pH of the latex was raised to 9.2 with aqueous ammonia. The latex was then placed in a stripper, and was heated with agitation, but without vacuum, to 90° C. Steam, at 100° C., was bubbled through the latex. Water and residual monomer were distilled off until about 100 grams were collected. Steam introduction was then discontinued and a vacuum was applied to further concentrate the latex. During these finishing operations almost no foaming occurred, so that these steps could be accomplished rapidly without foam traps. No coagulum was formed, which indicated that the latex was stable to thermal and mechanical forces. The latex had the following composition and properties: no grain microfloc or coagulum; solids 52.5%; pH 6.2; surface tension 73d./cm.; Brookfield viscosity 180 cps.; and turbidity 0.53.

The above properties clearly show that a highly desirable latex was formed. The turbidity is not too high for optimum usage, and yet the viscosity is of satisfactory value for efficient transfer. The solids content is high enough for economical production and transportation. The high surface tension, which facilitates finishing operations and eliminates the need for antifoaming agents since the latex does not foam, is accompanied by good stability in the stripper.

The above latex is considerably superior to those obtained using conventional emulsifiers, such as alkyl benzene sulfonates which, at 50% solids, have a surface tension of 30–40 d./cm. and readily form a foam on agitation, which foam interferes with finishing and use.

Part B

By using the oligomer, described in Part A of this example, at different levels and at different degrees of neutralization by potassium hydroxide, as the polymerization emulsifier in the Table 5 recipe, latex properties were varied over a wide region of the satisfactory area. The date for nine different runs is given in Table 6.

TABLE 6

Polymerization Performance and Latex Properties Using n-Octyl-S(O)-(acrylic acid)$_3$-H at Various Levels and Percent Neutralization as the Emulsifier

| Run No. | 1 | 2 | 3 | 4 | 5 | 6 | 7 | 8 | 9 |
|---|---|---|---|---|---|---|---|---|---|
| Oligomer parts | 3 | 4 | 5 | 3 | 4 | 5 | 3 | 4 | 5 |
| Percent neutralized | 10 | 10 | 10 | 31 | 31 | 31 | 53 | 53 | 53 |
| Hours to 100% conversion | 21 | 21 | 16 | 21 | 16 | 16 | 21 | 21 | 21 |
| Coagulum, per hundred monomer | 0.1 | 0.0 | 0.0 | 0.37 | 0.3 | 0.3 | 0.6 | 0.4 | 0.5 |
| Surface tension, d./cm. | 60 | 56 | 54 | 64 | 64 | 64 | 64 | 66 | 67 |
| Turbidity | 1.0 | 0.7 | 0.5 | 0.7 | 0.3 | 0.2 | 1.0 | 0.4 | 0.3 |
| Brookfield viscosity, cps. at 48–50% solids | 68 | 100 | 195 | 78 | 143 | 195 | 35 | 78 | 120 |
| Latex pH | 4.5 | 4.4 | 4.4 | 5.0 | 5.1 | 5.0 | 5.3 | 5.4 | 5.5 |

The above data show that notwithstanding the variations in the amount and degree of neutralization of the oligomer, the reaction time is short, the coagulum and latex viscosity are always low, and the surface tension is high. This is the desired trend for each of these parameters. The latex turbidity varies from 0.21 to 1.02, which is a satisfactory region, so that this oligomer has the desired quality of giving good performance and latex properties over a wide range of imposed variables.

The stability of latexes produced by Runs 2, 3, 5, and 6 was demonstrated by adding, to 100 parts of latex solids, 300 parts of dry calcium carbonate. The latex pH was raised to 9 with ammonia and sufficient water was added such that the solids of the mixture was 68%. Other materials in the system were a polyacrylate thickener to raise the viscosity, and for stability 1 part $Na_4P_2O_7$ plus 1 part sodium salt of condensed naphthalene sulfonic acids. In this test none of the latexes produced coagulum. Thus, they showed satisfactory stability for commercial use with fillers.

Stability to filler without the use of $Na_4P_2O_7$ and the sodium salt of condensed naphthalene sulfonic acid was accomplished by increasing the itaconic acid level from 1 to 1.5 and decreasing the styrene from 59 to 58.5, and using 5 parts of the oligomer, which was 25% neutralized, in the polymerization recipe of Part A. The latex showed only 0.1 part coagulum per 100 parts monomer, had 0.29 turbidity, and at 52% solids had only 110 cps. viscosity. These are outstanding properties for a latex. The pH of the latex was raised to 7 with KOH, it was heated to above 90° C. in a distillation apparatus, and atmospheric steam was introduced into the latex to co-distill off residual monomer with the water.

Under these conditions, a latex prepared using a conventional alkylbenzene sulfonate emulsifier will foam, and the flow of steam is kept low to prevent this foam from entering the receiver. The slow flow of steam and long time required to remove residual monomers dilutes the latex from 50% solids to as low as 20% solids. It is necessary to concentrate to higher solids for filler stability test. By contrast, with the instant latex a rapid flow of steam is effected since there is almost no foaming, and since removal of residual monomer is accomplished in a short time, the latex is only diluted to 45% solids from the original value of 50%. At this solids the latex is used in the filler stability test without concentration, even after raising the pH to 9 with KOH. The system is stable without the use of the aids mentioned previously. Since these aids are hydrophilic it is considered that the water resistance of the ultimate product is better without them.

Part C

Data are hereinafter presented to show that the instant oligomer forms a latex which, for a given value for turbidity and solids, has a lower viscosity than a latex prepared using as the oligomer n-octyl-S-(acrylonitrile)$_8$-(acrylic acid)$_8$-H. It is to be noted that as the turbidity decreases, i.e., as the latex particle size decreases, a given latex type at a certain percent solids, shows an increase in viscosity. It is important for a latex to be fluid so as to avoid loss through hold-up in transfer, so that lower viscosity is considered to be a property of distinct utility and advantage. In Table 7 the latexes were prepared using the recipe given in Part A of this example. The data for the oligomer, R-S-(O)-(acrylic acid)$_3$, is from Table 6. All solids are in the 48–50% range.

TABLE 7
Viscosity of Latexes Prepared Using n-Octyl-S(O)-(acrylic acid)$_3$-H or n-Octyl-S-(acrylonitrile)$_8$-(acrylic acid)$_8$-H Oligomers at Various Turbidities

| | Brookfield viscosity, cps. of latex | |
|---|---|---|
| Turbidity | n-Octyl-S(O)-(acrylic acid)$_3$-H | n-Octyl-S-(acrylonitrile)$_8$-(acrylic acid)$_8$-H |
| 0.30 | 114 | 1,457 |
| 0.40 | 195 | 1,344 |
| 0.60 | 89 | 243 |

These data show that the instant oligomer produces latexes with much lower viscosities than the reference oligomer.

Part D

As shown hereinafter, the preparation of a latex using n-octyl-S-(O)-acrylic acid)$_3$-H as the emulsifier rather than n-octyl-S(O)$_2$-acrylic acid)$_3$-H, results in reduced coagulum without significant changes in other properties. It is important to minimize coagulum because (1) it represents waste of raw materials and (2) there is loss of production time due to the need for more frequent cleaning of equipment. The polymerization recipe was the same as that given in Table 5 except that either 4 or 5 parts of the oligomer were used. The reactions were run for 64 hours at 50° C. and all reached 98–100% conversion. The results are given in Table 8, and show that use of the sulfoxide oligomer produced less coagulum.

TABLE 8
Properties of Latex as Influenced by Alkyl-sulfoxide or Alkyl-sulfone Terminated Oligomers as Polymerization Emulsifiers

| | Coagulum parts per 100 monomer | | Brookfield viscosity, cps. | | Turbidity | |
|---|---|---|---|---|---|---|
| Oligomer type | Sulfoxide | Sulfone | Sulfoxide | Sulfone | Sulfoxide | Sulfone |
| 5% neutralization of oligomer: | | | | | | |
| 4 parts oligomer | 0.2 | 0.5 | 140 | 103 | 0.4 | 0.5 |
| 5 parts oligomer | 0.0 | 0.4 | 143 | 155 | 0.4 | 0.4 |
| 15% neutralization of oligomer: | | | | | | |
| 4 parts oligomer | 0.3 | 0.4 | 200 | 138 | 0.3 | 0.4 |
| 5 parts oligomer | 0.2 | 0.4 | 288 | 210 | 0.2 | 0.4 |
| 25% neutralization of oligomer: | | | | | | |
| 4 parts oligomer | 0.2 | 0.3 | 230 | 165 | 0.2 | 0.3 |
| 5 parts oligomer | 0.2 | 0.2 | 380 | 315 | 0.2 | 0.2 |

Part E

The oligomers of the instant invention differ from the oligomers which are the subject of U.S. application Ser. No. 547,743, filed May 5, 1966, by the oxidation step. The use of the latter oligomers as emulsifiers in the formations of latexes, as set forth in U.S. application Ser. No. 562,097, filed July 1, 1966 and in U.S. application Ser. No. 562,098, filed July 1, 1966, may be accompanied by in situ oxidation. The following data are presented to compare pre-oxidation and whatever in situ oxidation may take place.

The polymerization recipe was identical with that given in Part A of this example. The oligomer was also the same except that a portion of it is not oxidized. There is enough potassium persulfate to oxidize 34% of the oligomer in the recipe. The data are presented in Table 9.

TABLE 9
The Effect on Polymerization Performance of Pre-oxidation vs. In Situ Oxidation of the Oligomer

| Run No. | 1 | 2 | 3 | 4 | 5 | 6 |
|---|---|---|---|---|---|---|
| Oligomer | (1) | (1) | (1) | (2) | (2) | (2) |
| Percent acid groups neutralized with KOH | 33 | 67 | 100 | 33 | 67 | 100 |
| pH 10% aqueous oligomer | 5.5 | 6.5 | 8.8 | 4.8 | 5.6 | 8.7 |
| Percent conversion | 87 | 2 | 0 | 99 | 99 | 77 |
| Hours | 24 | 64 | 64 | 22 | 22 | 64 |
| Coagulum, parts per 100 monomer | 1.08 | 0 | 0 | 0.23 | 0.30 | 0 |
| Latex turbidity | 0.48 | | | 0.42 | 0.53 | 21.12 |
| Surface tension, d/cm | | | | | 73 | |

[1] In situ oxidation.
[2] Pre-oxidation.

The data of Table 9 shows that complete pre-oxidation of the oligomer gives superior results to partial in situ oxidation. The latter causes lower conversions and more coagulum, neither of which is desirable in latex technology.

Information on partial pre-oxidation is given in Table 10 for a polymerization identical with that of Part A of this example. Here the same oligomer was used except that 33% and 67% pre-oxidation samples were used. The oligomer was 25% neutralized with KOH in all cases.

TABLE 10

Effect of Extent of Pre-Oxidation of Oligomer on Polymerization Performance

| Run No | 7 | 8 | 9 |
|---|---|---|---|
| Percent pre-oxidation of oligomer | 33 | 67 | 100 |
| Percent conversion | 96 | 97 | 100 |
| Hours | 64 | 64 | 64 |
| Coagulum, parts per 100 monomer | 2.24 | 0.61 | 0.40 |
| Turbidity | 0.55 | 0.42 | 0.42 |

The data in Table 10 shows a decrease in coagulum as the extent of pre-oxidation increases. This effect is important in efficient latex manufacture, inasmuch as coagulum wastes raw material and will ultimately increase maintenance because the reaction vessels will have to be cleaned.

EXAMPLE V

Following the procedure and using the polymerization formulation set forth in Example IV, Part A, Table 11 shows the use of various oligomers, of the $R\text{-}S\text{-}(O)\text{-}(\text{acrylic acid})_b\text{-}H$ type, as emulsifiers.

TABLE 11

Polymerization of Itaconic Acid/Butadiene/Styrene (1/40/59) Latex on $R\text{-}S(O)\text{-}\text{acrylic acid})_b\text{-}H$ type Oligomers

| Run No | 1 | 2 | 3 | 4 | 5 | 6 | 7 |
|---|---|---|---|---|---|---|---|
| Oligomer: | | | | | | | |
| R | $n\text{-}C_8$ | $n\text{-}C_8$ | $n\text{-}C_8$ | $n\text{-}C_8$ | $p\text{-}C_8$ | $t\text{-}C_8$ | $n\text{-}C_{10}$ |
| b | 2.5 | 3.5 | 4 | 6 | 3 | 3 | 3 |
| Percent of acid groups neutralized with KOH | 25 | 25 | 31 | 42 | 25 | 50 | 25 |
| Latex: | | | | | | | |
| Percent conversion | 98 | 99 | 97 | 98 | 32 | 22 | 99 |
| Hours | 64 | 64 | 64 | 21 | 64 | 64 | 64 |
| Coagulum, parts per 100 monomer | 0 | 0.5 | 0.4 | 0.3 | 0 | 8.4 | 0.5 |
| Turbidity | 1.3 | 0.2 | 0.3 | 1.0 | | | 0.3 |
| Brookfield viscosity, cps | | 630 | 445 | | | | 680 |
| Surface tension, d./cm | | 64 | 72 | | | | 63 |

The data in Table 11 show that with R of the $R\text{-}S\text{-}(O)\text{-}(\text{acrylic acid})_b\text{-}H$ type oligomer either primary or tertiary octyl, low ultimate conversions are obtained. Since this behavior represents efforts required to reclaim the unused raw materials, it is not conducive to optimum efficiency of latex manufacture. If R is n-decyl, the latex appears to be as satisfactory as when R is n-octyl. Values of $b$ at 2.5 and 6.0 give turbidities which are too high for economical manufacture since their cycle time is long. The best properties of the latex occur when $b$ is in the 3 to 4 range.

EXAMPLE VI

The use of oligomers of the type, $R\text{-}S\text{-}(O)\text{-}(\text{acrylonitrile})_a\text{-}(\text{acrylic acid})_b\text{-}H$, with R being a normal alkyl, as emulsifiers in latex preparation is described in this example. The procedure was the same as that in Example IV, Part A. The polymerization recipe differed from that given in Table 5 by increased potassium persulfate (1.25) and increased water (120).

Part A

The oligomers that were used in the polymerizations described hereinafter were represented by $n\text{-}\text{octyl-}S(O)_c\text{-}(\text{acrylonitrile})_8\text{-}(\text{acrylic acid})_8\text{-}H$, where $c$ is 1 or 2, and by the unoxidized sulfide precursor. In the polymerization recipe there is more than enough potassium persulfate to oxidize this precursor to the alkyl-sulfoxide terminated oligomer. The data are presented in Table 12.

TABLE 12

Effect of Value of $c$ in $n\text{-}\text{Octyl-}S(O)_c\text{-}(\text{acrylonitrile})\text{-}(\text{acrylic acid})_8\text{-}H$, and of pH of the Aqueous Solutions of These Oligomers, on Latex Properties

| Run No | 1 | 2 | 3 | 4 | 5 | 6 | 7 | 8 | 9 |
|---|---|---|---|---|---|---|---|---|---|
| $c$ Value | 0 | 1 | 2 | 0 | 1 | 2 | 0 | 1 | 2 |
| pH [1] | 5.7 | 5.7 | 5.7 | 6.0 | 6.0 | 6.0 | 6.5 | 6.5 | 6.5 |
| Latex: | | | | | | | | | |
| Percent conversion | 100 | 100 | 100 | 100 | 100 | 100 | 100 | 100 | 100 |
| Coagulum parts per hundred monomer | 0.6 | 0.0 | 0.0 | 0.1 | 0.0 | 0.0 | 0.0 | 0.0 | 0.0 |
| Turbidity | 0.4 | 1.8 | 2.3 | 0.9 | 2.6 | 2.8 | 0.8 | 1.7 | 2.0 |
| Brookfield viscosity, cps | 460 | 60 | 50 | 180 | 50 | 50 | 70 | 60 | 50 |
| Surface tension, d./cm | 76 | 78 | 76 | 73 | 78 | 74 | 75 | 72 | 76 |

[1] Of the aqueous solution. Oxidation of the alkyl-sulfide terminated oligomer to sulfoxide or sulfone was conducted at this pH. See Example II, Run 1.

The above data show that the pre-oxidized oligomers produce higher turbidity latexes at the three given pH's, than does the unoxidized precursor. While other properties are similar, this change in latex particle size is an important one and indicates process differences.

Part B

The polymerizations of Part A of this example were repeated, with changes in the amount of persulfate. The results are given in Table 13 and show that while the unoxidized oligomer does not polymerize at the lower level of persulfate, the preoxidized produces high turbidity latex at both persulfate levels.

TABLE 13

Effect of Type of Oxidation of Oligomer and Persulfate Level in Polymerization Recipe on Latex Performance and Properties

| Run No | 1 | 2 | 3 | 4 |
|---|---|---|---|---|
| Aqueous oligomer solution pH | 6.5 | 6.5 | 6.5 | 6.5 |
| Pre-oxidation [1] | No | No | Yes | Yes |
| $K_2S_2O_8$ | 0.4 | 12.5 | 0.4 | 1.25 |
| Initial polymerization rate, percent conversion/hour | 0 | 6.3 | 2.1 | 3.0 |
| Final percent conversion | 0 | 99 | 92 | 100 |
| Coagulum, parts per 100 monomer | 0 | 1.06 | 0.02 | 0.01 |
| Turbidity | | 0.39 | 1.25 | 1.45 |

[1] To sulfoxide terminated oligomer.

The foregoing data show that the polymerization rate on the unoxidized precursor is greater than on the pre-oxidized oligomer. This is an important difference as regards economical latex manufacture. The ability to use less initiator, e.g., $K_2S_2O_8$, with the pre-oxidized oligomer is of distinct value, since reduction its amount would tend to improve water resistance of the ultimate product.

Part C

The preparation of $R\text{-}S(O)_2\text{-}(\text{acrylonitrile})_8\text{-}(\text{acrylic acid})_{12}\text{-}H$, where R is a 99/1 mole ratio mixture of n-octyl and n-dodecyl, and its unoxidized precursor was described in Example II, Run 2. Both oligomers had their pH adjusted to 6.5 with KOH and were used in a polymerization at 4 parts at 50° C. The other ingredients in the polymerization were butadiene (40 parts), styrene (59 parts), itaconic acid (1 part), along with 1.5 part $K_2S_2O_8$, 0.4 part $K_2CO_3$, 0.07 part tetrasodium ethylenediamine tetraacetate, 0.1 part tertiary dodecyl mercaptan, and 120 parts water. At 100% conversion, the latex prepared using unoxidized precursor showed 0.03 parts coagulum per hundred of monomer and had a turbidity of 0.4. The latex prepared using alkyl-sulfone terminated oligomer had no prefloc but showed a turbidity of 2.3. This further demonstrates that use of the alkyl-sulfide terminated oligomer is a different process than use of the pre-oxidized oligomer. Note the variation in latex turbidity.

EXAMPLE VII

Use of the oligomer, $n\text{-}\text{decyl-}S(O)\text{-}(\text{acrylonitrile})_8\text{-}(\text{acrylic acid})_8\text{-}H$, as emulsifiers in latex preparation is described in this example. The procedure was the same as in Example IV, Part A. The polymerization recipe differed from that given in Table 5 by increased potassium persulfate (to 1.25) and increased water (to 120). The data is given in Table 14, the performance of the unoxidized oligomer also being included.

TABLE 14

Effect on Polymerization Performance and Latex Properties of the Oligomeric Emulsifier, n-decyl-S(O)-(acrylonitrile)₈-(acrylic acid)₈-H and its Unoxidized Precursor

| Run No. | 1 | 2 | 3 | 4 | 5 | 6 |
|---|---|---|---|---|---|---|
| Preoxidation of oligomer | No | Yes | No | Yes | No | Yes |
| Oligomer pH (KOH neutralized) | 5.7 | 5.7 | 6.5 | 6.5 | 9.0 | 9.0 |
| Percent conversion | 84 | 95 | 91 | 100 | 92 | 100 |
| Turbidity | 0.15 | 0.40 | 0.17 | 0.14 | 0.16 | 0.10 |
| Percent solids | 41 | 46 | 44 | 48 | 44 | 48 |
| Brookfield viscosity, cps | 930 | 4,950 | 2,325 | 10,000 | 3,300 | 19,500 |

These data show substantial differences in turbidity only at the lowest pH. Another difference between pre-oxidation and use of unoxidized precursor appears to be the higher ultimate conversion attained with the former, notwithstanding that there is enough potassium persulfate in the recipe to completely oxidize in situ the latter.

EXAMPLE VIII

This example is similar to Example VII, except that the oligomer was n-decyl-S(O)-(acrylonitrile)₁₀-(acrylic acid)₂₀-H. The data is given in Table 15.

TABLE 15

Effect on Polymerization Performance and Latex Properties of the Oligomeric Emulsifier, n-decyl-S(O)-(acrylonitrile)₁₀-(acrylic acid)₂₀-H and its Unoxidized Precursor

| Run No. | 1 | 2 | 3 | 4 | 5 | 6 |
|---|---|---|---|---|---|---|
| Pre-oxidation of oligomer | No | Yes | No | Yes | No | Yes |
| Oligomer pH (KOH neutralized) | 5.9 | 5.6 | 6.5 | 6.5 | 9.0 | 9.0 |
| Percent conversion | 99 | 100 | 100 | 100 | 100 | 100 |
| Coagulum, parts per 100 monomer | 0.31 | 0.03 | 0.08 | 0.03 | 0.06 | 0.02 |
| Turbidity | 0.39 | 0.72 | 0.80 | 0.79 | 0.58 | 0.60 |
| Brookfield viscosity, cps | 170 | 250 | 230 | 330 | 280 | 420 |
| Percent solids | 47 | 48 | 47 | 47 | 47 | 47 |

These data establish that at the lower pH the unoxidized precursor forms a latex with lower turbidity than that of the pre-oxidized oligomer. At other pHs, the two processes are equivalent in latex properties. All latexes have turbidity, viscosity and coagulum values which have utility in latex manufacture.

EXAMPLE IX

Use of oligomers of the type,

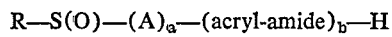
R—S(O)—(A)ₐ—(acryl-amide)ᵦ—H as emulsifiers in latex preparation is described in this example. R is an alkyl group and A is either acrylic acid or itaconic acid. The procedure was the same as in Example IV, Part A, and the polymerization recipe was as given in Table 5, except that 5 parts unneutralized oligomer were used. The performance of the unoxidized oligomer also is given. The data is given in Table 16.

EXAMPLE X

In this example, the oligomer type was the same as used in Example IX. The polymerization recipe was changed to: styrene 70, acrylonitrile 30, potassium persulfate 1.25, unneutralized oligomer 5, sodium carbonate 0.4, tetrasodium ethylenediamine tetraacetate 0.05, tertiary dodecyl mercaptan 0.15 and water 120. The data are given in Table 17.

TABLE 17

Effect on Polymerization Performance and Latex Properties of the Oligomer, R-S(O)-(A)ₐ-(acrylamide)ᵦ-H and Its Unoxidized Precursor

| Run No. | A¹ | R | a | b | Pre-oxidation | Percent conversion | Coagulum, p.h.m.² |
|---|---|---|---|---|---|---|---|
| 1 | I | n-C₈ | 2 | 18 | Yes | 98% | Nil. |
| 2 | I | n-C₈ | 2 | 18 | No | 97% | Nil. |
| 3 | A | (³) | 4 | 16 | Yes | 98% | Nil. |
| 4 | A | (³) | 4 | 16 | No | 98% | Nil. |
| 5 | I | n-C₈ | 4 | 16 | Yes | 98% | Nil. |
| 6 | I | n-C₈ | 4 | 16 | No | 96% | Nil. |
| 7 | I | n-C₈ | 4 | 36 | Yes | 97% | Nil. |
| 8 | I | n-C₈ | 4 | 36 | No | 97% | Nil. |
| 9 | I | n-C₈ | 1.1 | 13.9 | Yes | 98% | Nil. |
| 10 | I | n-C₈ | 1.1 | 13.9 | No | 98% | Nil. |
| 11 | I | t-C₈ | 2 | 18 | Yes | 88% | Nil. |
| 12 | I | t-C₈ | 2 | 18 | No | All gel | |

¹ I is itaconic acid, A is acrylic acid.
² P.h.m. stands for parts per 100 monomer.
³ The R group in this oligomer was 0.975 mole fraction n-octyl and 0.025 mole fraction n-dodecyl.

Variations can of course be made without departing from the spirit of my invention.

Having thus described my invention, what I claim and desire to protect by Letters Patent is:

1. In a process for the emulsion polymerization of ethylenically unsaturated compounds in the presence of a free radical or a redox catalyst and an emulsifier, the improvement of carrying out the process in the presence of an emulsifier having the formula:

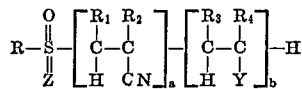

wherein R is a straight chain primary, branch chain primary, secondary, or tertiary alkyl group having from 5 to 20 carbon atoms or mixtures thereof; $R_1$ and $R_3$ are hydrogen, methyl, ethyl or —COOH; $R_2$ and $R_4$ are hydrogen, methyl, ethyl, —COOH or —CH₂COOH; Y is —COOH, —CONH₂, —OCH₃, —OC₂H₅, or —CH₂OH; $a+b$ is from 4 to 50; $a/a+b$ is greater than 0 and not greater than 0.6; Z is oxygen or nothing; and where said emulsifier contains at least one carboxylic acid group, the said group being in the form of the free acid or a water-soluble salt thereof.

2. The emulsion polymerization process of claim 1 wherein the R is a normal alkyl having from 7 to 11 carbon atoms or mixtures thereof, $R_1$ is hydrogen, $a+b$ is from 12 to 30, and $a/a+b$ is from 0.2 to 0.55.

3. The emulsion polymerization process of claim 1 wherein R is normal octyl, normal decyl or normal do-

TABLE 16

Effect on Polymerization Performance and Latex Properties of the Oligomer, R-S(O)-(A)ₐ-(Acrylamide)ᵦ-H and its Unoxidized Precursor in Unneutralized State

| R | Run No. | A¹ | a | b | Preoxidation | Percent conversion | Coagulum parts per 100 monomer | Brookfield viscosity, cps. |
|---|---|---|---|---|---|---|---|---|
| n-C₈ | 1 | I | 2 | 18 | Yes | 99 | 0.04 | 220 |
| n-C₈ | 2 | I | 2 | 18 | No | 99 | 0.19 | 340 |
| n-C₁₂ | 3 | I | 2 | 18 | Yes | 100 | | 200,000 |
| n-C₁₂ | 4 | I | 2 | 18 | No | | (²) | |
| n-C₈ | 5 | I | 4 | 16 | Yes | 99 | 0.39 | 2,000 |
| n-C₈ | 6 | I | 4 | 16 | No | 98 | 0.56 | 2,965 |
| n-C₈ | 7 | I | 4 | 36 | Yes | 100 | 0.16 | 200 |
| n-C₈ | 8 | I | 4 | 36 | No | 100 | 0.14 | 310 |
| n-C₈ | 9 | I | 1.1 | 13.9 | Yes | 100 | 0.12 | 1,140 |
| n-C₈ | 10 | I | 1.1 | 13.9 | No | 99 | 0.42 | 1,800 |
| t-C₈ | 11 | I | 2 | 18 | Yes | 100 | 1.07 | 124 |
| t-C₈ | 12 | I | 2 | 18 | No | 99 | 0.90 | 104 |

¹ I=Itaconic acid; A=Acrylic acid.
² 100% gel.

decyl, or mixtures thereof, $R_1$ is hydrogen, $a+b$ is about 16 and $a/a+b$ is about 0.5.

4. The emulsion polymerization process of claim 1 wherein said polymerization is the addition polymerization of a vinyl conjugated diolefin type monomeric material.

5. The emulsion polymerization process of claim 4 wherein said monomeric material is polymerized in the presence of a carboxylating agent.

6. The emulsion polymerization process of claim 5 wherein said carboxylating agent is itaconic acid, acrylic acid or methacrylic acid.

7. The emulsion polymerization process of claim 4 wherein said monomeric material is butadiene and styrene.

8. The emulsion polymerization process of claim 7 wherein said monomeric material is polymerized in the presence of a carboxylating agent.

9. The emulsion polymerization process of claim 4 wherein said monomeric material is butadiene and acrylonitrile.

10. The emulsion polymerization process of claim 9 wherein said monomeric material is polymerized in the presence of a carboxylating agent.

11. The emulsion polymerization process of claim 4 wherein said monomeric material is an acrylate ester with a minor amount of at least one other vinyl monomer.

12. The emulsion polymerization of claim 11 wherein said acrylate ester is ethyl acrylate, said other vinyl monomers being mixtures of (1) styrene, methyl, methacrylate, butyl acrylate or vinyl acetate, and (2) acrylic acid, methacrylic acid or itaconic acid.

13. The emulsion polymerization process of claim 11 wherein said acrylate ester is butyl acrylate and said other vinyl monomer is acrylonitrile.

14. In a process for the emulsion polymerization of butadiene-styrene and itaconic acid in the presence of a free-radical or redox catalyst and an emulsifier, the improvement of carrying out the process in the presence of an emulsifier having the formula n-octyl—$SO_2$—$(CH_2$—CHCN$)_a$—
$(CH_2CH$—COOH$)_b$—H in the form of the free acid or a water-soluble salt thereof.

15. A latex containing a polymer of ethylenically unsaturated compounds and, as an emulsifier, a compound having the formula:

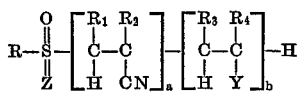

wherein R is a straight chain primary, branch chain primary, secondary, or tertiary alkyl group having from 5 to 20 carbon atoms or mixtures thereof; $R_1$ and $R_3$ are hydrogen, methyl, ethyl or —COOH; $R_2$ and $R_4$ are hydrogen, methyl, ethyl, —COOH or —$CH_2COOH$; Y is —COOH, —$CONH_2$, —$OCH_3$, —$OC_2H_5$, or —$CH_2OH$; $a+b$ is from 4 to 50; $a/a+b$ is greater than 0 and not greater than 0.6; Z is oxygen or nothing; and where said emulsifier contains at least one carboxylic acid group, the said group being in the form of the free acid or a water-soluble salt thereof.

16. A latex containing a carboxylated styrene-butadiene polymer and from 2 to 8 parts by weight of an emulsifier based on 100 parts of polymer, having the formula n-octyl—$SO_2$—$(CH_2$—CHCN$)_a$—
$(CH_2CH$—COOH$)_b$—H in the form of the free acid or a water-soluble salt thereof.

17. An addition polymer composition containing from 2 to 8 parts by weight of an emulsifier for each 100 parts of polymer and prepared by the emulsion polymerization of ethylenically unsaturated compounds in the presence of a free radical or a redox catalyst, the emulsifier having the formula:

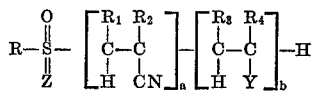

wherein R is a straight chain primary, branch chain primary, secondary, or tertiary alkyl group having from 5 to 20 carbon atoms or mixtures thereof; $R_1$ and $R_3$ are hydrogen, methyl, ethyl or —COOH; $R_2$ and $R_4$ are hydrogen, methyl, ethyl, —COOH or —$CH_2COOH$; Y is —COOH, —$CONH_2$, —$OCH_3$, —$OC_2H_5$, or —$CH_2OH$; $a+b$ is from 4 to 50; $a/a+b$ is greater than 0 and not greater than 0.6; Z is oxygen or nothing; and where said emulsifier contains at least one carboxylic acid group, the said group being in the form of the free acid or a water-soluble salt thereof.

18. A butadiene-styrene-itaconic acid polymer composition containing from 2 to 8 parts by weight of an emulsifier for each 100 parts by weight of polymer, the emulsifier having the formula n-octyl—$SO_2$—$(CH_2$—CHCN$)_a$—
$(CH_2CH$—COOH$)_b$—H in the form of the free acid or a water-soluble salt thereof.

References Cited
UNITED STATES PATENTS 3,256,234   6/1966   Miller _____ 260—29.7 T
3,407,164   10/1968  Schmidt _____ 260—29.7 H WILLIAM H. SHORT, Primary Examiner L. M. PHYNES, Assistant Examiner U.S. Cl. X.R.

260—29.6 H, MN, 29.6 MQ, N, Z, 29.7 H, N, 29.7 SQ, T, 78.5 BB, 80.3 R, 80.6, 80.7, 80.8, 80.81, 82.1, 82.7, 84.3, 85.5 N, 85.7, 86.1 R, 86.7, 88.1, 88.7 F, 89.5 R, 93.5 W, 94.4